(12) United States Patent
Xi et al.

(10) Patent No.: US 9,285,916 B2
(45) Date of Patent: Mar. 15, 2016

(54) TOUCH POINT DETECTING CIRCUIT, INDUCTIVE TOUCH SCREEN AND TOUCH DISPLAY DEVICE

(71) Applicants: Shanghai AVIC Optoelectronics Co., Ltd., Shanghai (CN); Tianma Micro-Electronics Co., Ltd., Shenzhen (CN)

(72) Inventors: Kerui Xi, Shanghai (CN); Jun Li, Shanghai (CN); Zhaokeng Cao, Shanghai (CN)

(73) Assignees: Shanghai AVIC OPTO Electronics Co., Ltd., Shanghai (CN); Tianma Micro-Electronics Co., Ltd., Shenzhen (CN)

( * ) Notice: Subject to any disclaimer, the term of this patent is extended or adjusted under 35 U.S.C. 154(b) by 0 days.

(21) Appl. No.: 14/267,674

(22) Filed: May 1, 2014

(65) Prior Publication Data
US 2015/0022488 A1    Jan. 22, 2015

(30) Foreign Application Priority Data
Jul. 19, 2013 (CN) .......................... 2013 1 0307274

(51) Int. Cl.
G06F 3/045 (2006.01)
G06F 3/041 (2006.01)
G06F 3/047 (2006.01)
G06F 3/046 (2006.01)

(52) U.S. Cl.
CPC .............. *G06F 3/0416* (2013.01); *G06F 3/046* (2013.01); *G06F 3/047* (2013.01); *G06F 3/041* (2013.01); *G06F 3/045* (2013.01)

(58) Field of Classification Search
CPC ....... G06F 3/0416; G06F 3/047; G06F 3/041; G06F 3/045
USPC ......................................................... 345/174
See application file for complete search history.

(56) References Cited

U.S. PATENT DOCUMENTS

| 2011/0193818 | A1* | 8/2011 | Chen et al. | .................... 345/174 |
| 2014/0015522 | A1* | 1/2014 | Widmer et al. | ............... 324/239 |

FOREIGN PATENT DOCUMENTS

CN             102253787 A       11/2011

* cited by examiner

*Primary Examiner* — Fred Tzeng
(74) *Attorney, Agent, or Firm* — Alston & Bird LLP

(57) ABSTRACT

A touch point detecting circuit, an inductive touch screen and a touch display device are disclosed. The touch point detecting circuit includes a plurality of mutually inductive units arranged in an array, wherein each mutually inductive unit includes a first coil and a second coil which are mutually coupled inductors, the first coil of each mutually inductive unit in a same row is electrically connected to an identical first signal line, and the second coil of each mutually inductive unit in a same column is electrically connected to an identical second signal line. By adopting the touch point detecting circuit provided in the technical solution, not only may the detection precision be relatively high, but also the positions of touch points may be determined by detecting the mutual inductance change of each mutually inductive unit, so that multi-point touch is realized.

17 Claims, 6 Drawing Sheets

TOUCH POINT DETECTING CIRCUIT, INDUCTIVE TOUCH SCREEN AND TOUCH DISPLAY DEVICE

CROSS REFERENCE TO RELATED APPLICATIONS

This application claims the benefit of priority to Chinese Patent Application No. 201310307274.0, filed with the Chinese Patent Office on Jul. 19, 2013 and entitled "TOUCH POINT DETECTING CIRCUIT, INDUCTIVE TOUCH SCREEN AND TOUCH DISPLAY DEVICE", the content of which is incorporated herein by reference in its entirety.

TECHNICAL FIELD

The present invention relates to the technical field of touch screens, in particular to a touch point detecting circuit, an inductive touch screen and a touch display device.

BACKGROUND OF THE INVENTION

In recent years, touch technology has been universally used in daily work and life. Since a user may touch a touch screen by hand or with other object to input information, the dependency of the user on other input equipment (such as keyboard, mouse and remote controller) is reduced and even eliminated, and the operation of the user is facilitated.

FIG. 1 shows a schematic diagram of a partial structure of a touch point detecting circuit of the existing inductive touch screen. The touch point detecting circuit 11 includes a plurality of inductive units, and each inductive unit can represent a position coordinate on the touch screen, wherein each inductive unit 12 includes a spiral coil with two connecting ends. As known from FIG. 1, each inductive unit 12 is connected to an identical input connecting terminal 13 through an input signal line 13a, and each inductive unit 12 has an output signal line 14a connected to a different output connecting terminal 14 respectively. Accordingly, when the user simultaneously touches different points of the touch screen, the touch screen can determine the positions of multiple touch points through detecting an induced current generated by an inductive unit 12 corresponding to each touch point, so as to achieve multi-point touch. However, each inductive unit is provided with one output connecting terminal, a large amount of space may be occupied for wiring, and the total space of a panel of the touch screen is limited, so the space occupied by the inductive units is reduced, the quantity of the inductive units is also limited, then the position coordinates on the touch screen are reduced, thus the detection precision of the touch points is relatively low.

FIG. 2 shows a schematic diagram of a touch point detecting circuit of another existing inductive touch screen. The touch point detecting circuit includes a plurality of inductive units 21 likewise, and each inductive unit 21 includes a spiral coil, wherein the inductive units 21 of a same row are jointly connected to a row detecting circuit 22 of this row, and the inductive units 21 of the same column are jointly connected to a column detecting circuit 23 of this column. Compared with the above-mentioned solution, the space occupied for wiring is obviously reduced, so the quantity of the inductive units 21 is increased, the position coordinates on the touch screen are also increased, thus the detection precision of the touch points is relatively high. However, just due to this structure, when the user simultaneously touches different points on the touch screen, the row detecting circuits 22 and the column detecting circuits 23 corresponding to these touch points will find a position where the inductive unit 21 has the maximum induced current value by comparing the magnitude of the current values of multiple induced currents generated by each inductive units 21, and determines the position as a unique touch point, so this solution is merely applicable to single-point touch and produces misjudgment under the condition of multi-point touch.

An inductive touch screen capable of detecting the touch points with relatively high precision and realizing multi-point touch does not exist at present.

BRIEF SUMMARY OF THE INVENTION

In embodiments of the present invention, a touch point detecting circuit, an inductive touch screen and a touch display device are provided.

Specifically, in an embodiment of the present invention a touch point detecting circuit includes:

a plurality of mutually inductive units arranged in an array, wherein each mutually inductive unit includes a first coil and a second coil which are mutually coupled inductors, wherein the first coil of each mutually inductive unit in a same row is electrically connected to an identical first signal line, and the second coil of each mutually inductive unit in a same column is electrically connected to an identical second signal line, wherein each first signal line is electrically connected to an input terminal of a touch scanning signal, and different first signal lines are electrically connected to different input terminals respectively; each second signal line is electrically connected to an output terminal of the touch scanning signal, and different second signal lines are electrically connected to different output terminals respectively; or each first signal line is electrically connected to an output terminal of a touch scanning signal, and different first signal lines are electrically connected to different output terminals respectively; each second signal line is electrically connected to an input terminal of the touch scanning signal, and different second signal lines are electrically connected to different input terminals respectively.

In another embodiment, an inductive touch screen includes the above-mentioned touch point detecting circuit.

In another embodiment, a touch display device includes the above-mentioned inductive touch screen.

DETAILED DESCRIPTION OF THE PREFERRED EMBODIMENTS

In order to solve the problem that an inductive touch screen in the prior art cannot simultaneously realize relatively high touch point detection precision and multi-point touch, the inventor provides a touch point detecting circuit, an inductive touch screen and a touch display device through research. The touch point detecting circuit in this technical solution includes a plurality of mutually inductive units arranged in an array, and each mutually inductive unit includes a first coil and a second coil which are mutually coupled inductors, wherein the first coil of each mutually inductive unit in a same row is electrically connected to an identical first signal line, and the second coil of each mutually inductive unit in a same column is electrically connected to an identical second signal line. Compared with the prior art, the touch point detecting circuit has the advantages that on the one hand, the space occupied for wiring is relatively small, the space occupied by the mutually inductive units is relatively large, therefore the quantity of the mutually inductive units is relatively large, then the touch screen has more position coordinates for detection, so that the detection precision of touch points is relatively high; on the other hand, since different mutually inductive units are provided with different signal input terminals and signal output terminals respectively, when a user simultaneously touches different points on the touch screen, the touch screen can determine the positions of multiple touch points through detecting the mutual inductance change generated by each mutually inductive unit corresponding to each touch point, thus realizing multi-point touch.

To achieve the above-mentioned objectives, characteristics and advantages of the present invention be obvious and easy to understand, the specific embodiments of the present invention are described in detail below in conjunction with the accompanying drawings.

Specific details are illustrated in the following descriptions to fully understand the present invention. However, the present invention may be implemented in multiple other modes different from the descriptions herein, and similar promotions may be made by those skilled in the art without departing from the contents of the present invention. Accordingly, the present invention is not limited to the specific embodiments disclosed below.

Figure 1:
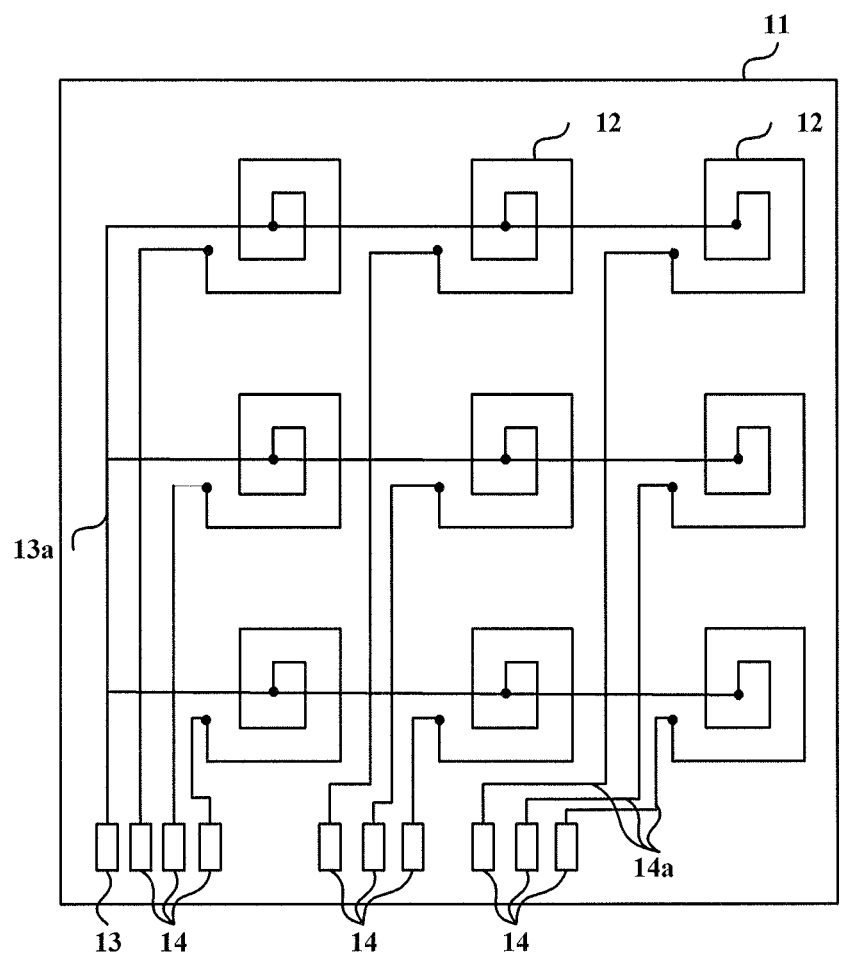
FIG. 1 is a schematic diagram of a partial structure of a touch point detecting circuit of an inductive touch screen in the prior art.
Figure 2:
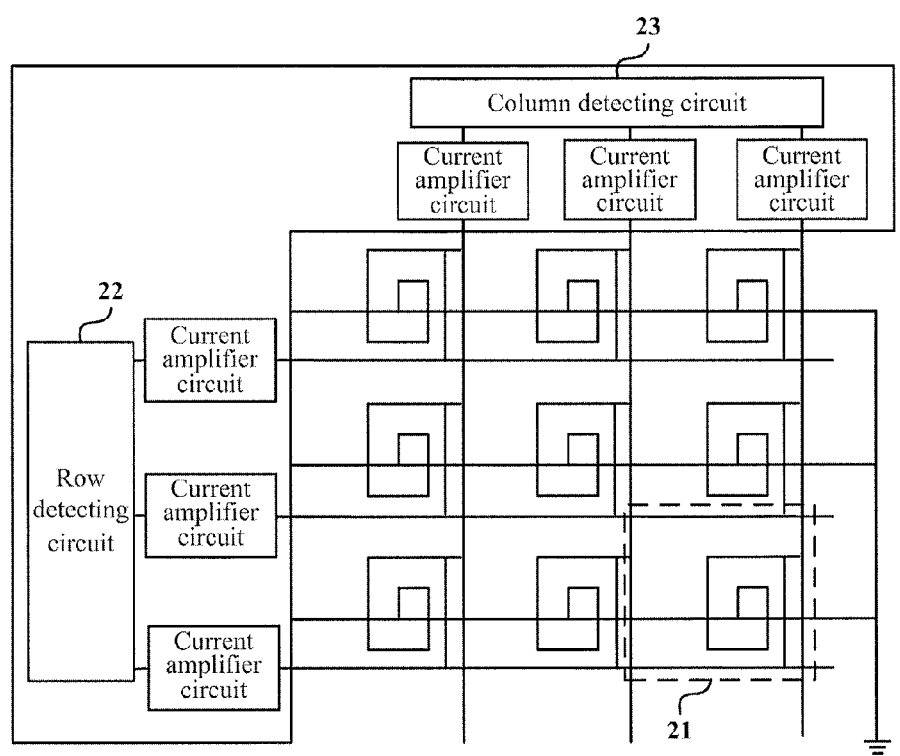
FIG. 2 is a structural schematic diagram of a touch point detecting circuit of another inductive touch screen in the prior art.
Figure 3A:
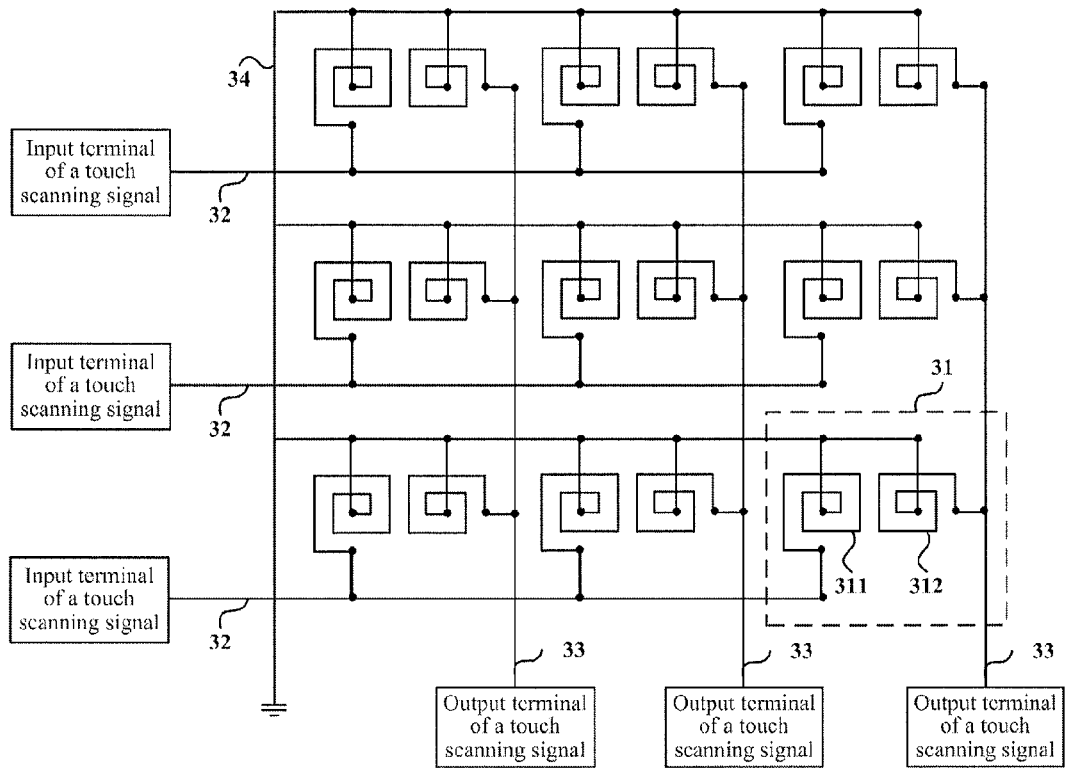
FIG. 3a is a structural schematic diagram of a touch point detecting circuit provided in an embodiment of the present invention.

FIG. 3a shows a structural schematic diagram of a touch point detecting circuit provided in an embodiment of the present invention. The touch point detecting circuit includes a plurality of mutually inductive units 31 arranged in an array, wherein each mutually inductive unit 31 includes a first coil 311 and a second coil 312 which are mutually coupled inductors, wherein, the first coil 311 of each mutually inductive unit 31 in a same row is electrically connected to an identical first signal line 32, and the second coil 312 of each mutually inductive unit 31 in a same column is electrically connected to an identical second signal line 33, wherein each first signal line 32 is electrically connected to an input terminal of a touch scanning signal, and different first signal lines 32 are electrically connected to different input terminals of the touch scanning signals respectively; and each second signal line 33 is electrically connected to an output terminal of the touch scanning signal, and different second signal lines 33 are electrically connected to different output terminals of the touch scanning signals respectively.

It should be noted that in actual application, the first signal lines 32 and the second signal lines 33 may also be connected in the following mode: each first signal line 32 is electrically connected to an output terminal of a touch scanning signal, and different first signal lines 32 are electrically connected to different output terminals of the touch scanning signals respectively; and each second signal line 33 is electrically connected to an input terminal of the touch scanning signal, and different second signal lines 33 are electrically connected to different input terminals of the touch scanning signals respectively.

Specifically, in the embodiment of the present invention, each of the first coil 311 and the second coil 312 includes two connecting ends, one connecting end of the first coil 311 of each mutually inductive unit 31 in a same row is electrically connected to an identical first signal line 32, and the other connecting end of the first coil 311 is preferably electrically connected to a common electrode line 34; and one connecting end of the second coil 312 of each mutually inductive unit 31 in a same column is electrically connected to an identical second signal line 33, and the other connecting end of the second coil 312 is preferably electrically connected to the common electrode line 34.

In the embodiment of the present invention, the geometrical shapes or outline of the first coils 311 and the second coils 312 can be regard as square, and the first coil 311 and the second coil 312 in each mutually inductive unit 31 have the same winding density.

Since the first coil 311 and the second coil 312 are mutually coupled inductors, when a conductor approaches the first coil 311 and the second coil 312, mutual inductance is generated between the first coil 311 and the second coil 312. The magnitude of the mutual inductance is affected by the factors such as their geometrical shape or outline, winding density, number of the first coil 311 and the second coil 312, and the like.

Figure 3B:
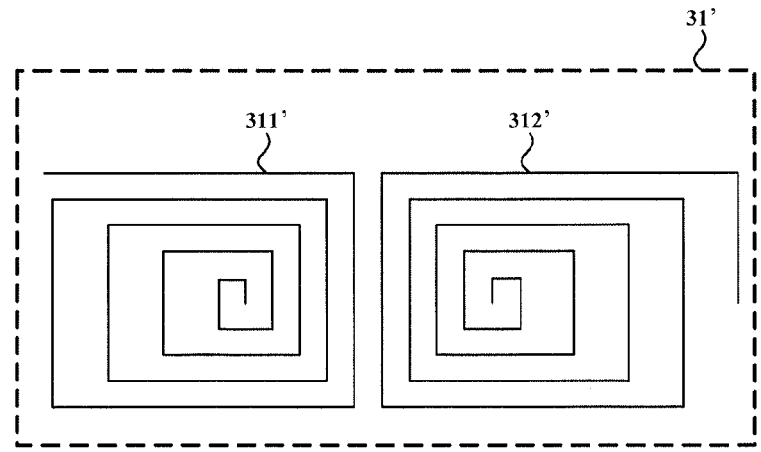
FIG. 3b is a structural schematic diagram of a mutually inductive unit provided in an embodiment of the present invention.

Therefore, it should be noted that in actual application, the geometrical shapes or outline of the first coils 311 and the second coils 312 may also be other shapes, such as circle, rhombus and triangle. In addition, the mutual inductance generated between the first coil 311 and the second coil 312 may be increased by changing the winding density of the first coil 311 and the second coil 312 in each mutually inductive unit 31, so that the detection sensitivity is improved. For example, FIG. 3b shows a structural schematic diagram of a mutually inductive unit provided in an embodiment of the present invention, wherein, in the mutually inductive unit 31', the winding density of the first coil 311' at the place close to the second coil 312' is higher than that of the first coil 311' at the place away from the second coil 312', and the winding density of the second coil 312' at the place close to the first coil 311' is higher than that of the second coil 312' at the place away from the first coil 311'. The connecting modes of the first coil 311' and the second coil 312' are the same as those of the first coil 311 and the second coil 312 in FIG. 3a, and are not described redundantly.

Figure 3C:
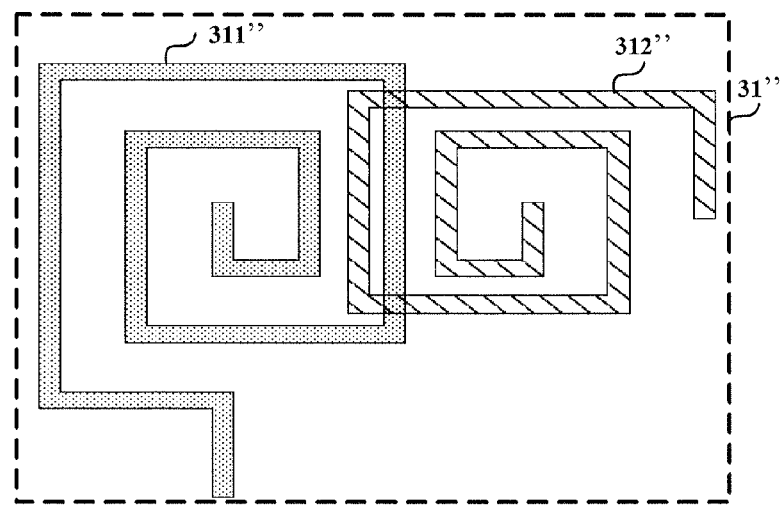
FIG. 3c is a structural schematic diagram of a mutually inductive unit provided in another embodiment of the present invention.

For another example, FIG. 3c shows a structural schematic diagram of a mutually inductive unit provided in another embodiment of the present invention, wherein, in the mutually inductive unit 31", the winding density of the first coil 311" with the second coil 312" at a mutual inductance position is higher than that at a non-mutual inductance position, and the winding density of the second coil 312" with the first coil 311" at a mutual inductance position is higher than that at a non-mutual inductance position. The connecting modes of the first coil 311" and the second coil 312" are the same as those of the first coil 311 and the second coil 312 in FIG. 3*a*, and are not described redundantly.

Figure 3D:
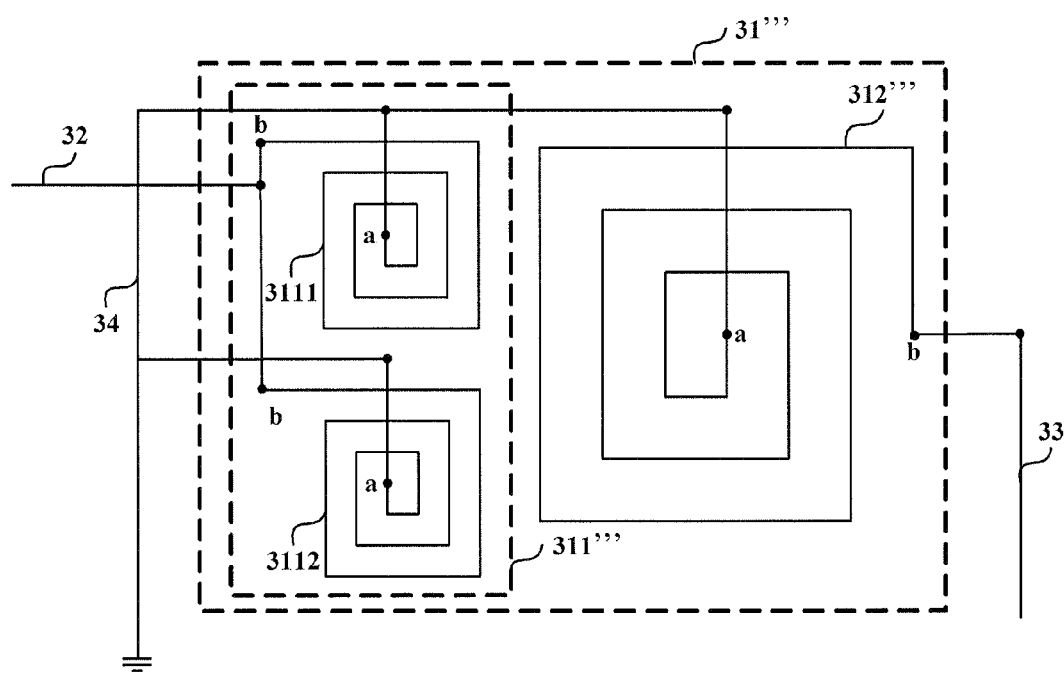
FIG. 3d is a structural schematic diagram of a mutually inductive unit provided in another embodiment of the present invention.

Further, in order to increase the mutual inductance generated between the first coil and the second coil and improve the detection sensitivity, the first coil may further include two sub-coils. FIG. 3*d* shows a structural schematic diagram of a mutually inductive unit provided in another embodiment of the present invention, wherein in the mutually inductive unit 31''', the first coil 311''' includes a first sub-coil 3111 and a second sub-coil 3112 both of which have an independent winding paths (wound anticlockwise), and each of the first sub-coil 3111 and the second sub-coil 3112 includes two connecting ends. For convenient description, as shown in FIG. 3*d*, a connecting end at the center of the first sub-coil 3111 is defined as End a and the other end is defined as End b, likewise, a connecting end at the center of the second sub-coil 3112 is defined as End a and the other end is defined as End b; the connecting end at the center of the second coil 312''' is End a which is connected to a common electrode line 34, and the other end of the second coil 312''' is end b which is connected to a second signal line 33. Referring to FIG. 3*d*, the End b of the first sub-coil 3111 and the End b of the second sub-coil 3112 are jointly and electrically connected to an identical first signal line 32, and the End a of the first sub-coil 3111 and the End a of the second sub-coil 3112 are jointly and electrically connected to the common electrode line 34, thus under such condition, in order that the first sub-coil 3111 and the second sub-coil 3112 may respectively form a mutually coupled inductor with the second coil 312''', the connecting mode of the two sub-coils should be the same, that is, the end of the first sub-coil 3111 connected to the common electrode line 34 and the end of the second sub-coil 3112 connected to the common electrode line 34 need to be the same (that is End a), and the end of the first sub-coil 3111 connected to the first signal line 32 and that of the second sub-coil 3112 connected to the first signal line 32 need to be the same (that is End b). It should be noted that in actual application, the first sub-coil 3111 and the second sub-coil 3112 may also be wound clockwise, and correspondingly, the connecting way of the second coil 312''' may also be adjusted to form a mutual inductor according to the winding mode of the first coil 311'''.

Figure 3E:
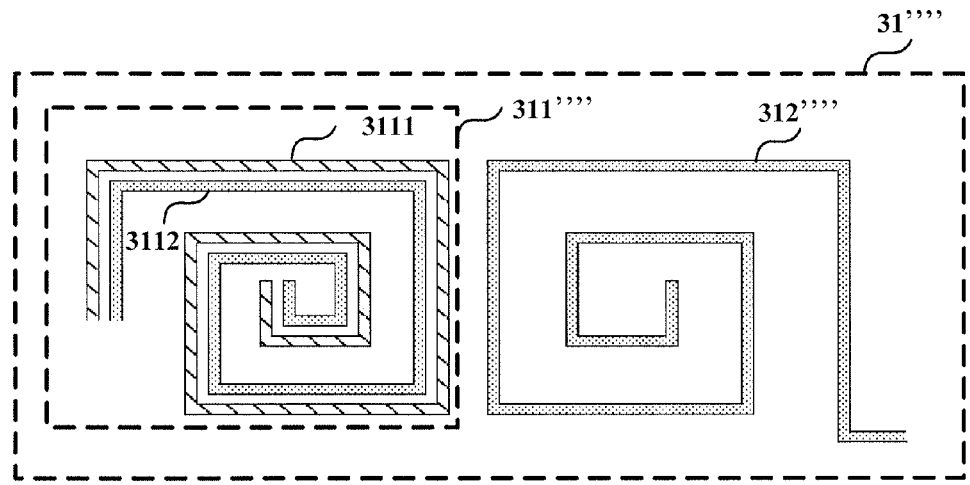
FIG. 3e is a structural schematic diagram of a mutually inductive unit provided in another embodiment of the present invention.

The first sub-coil 3111 and the second sub-coil 3112 may also have a common winding path besides the independent winding paths. FIG. 3*e* shows a structural schematic diagram of a mutually inductive unit provided in an embodiment of the present invention, wherein the first coil 311'''' of the mutually inductive unit 31'''' includes a first sub-coil 3111 and a second sub-coil 3112 which have a common winding path. The connecting modes of the first sub-coil 3111, or the second sub-coil 3112, with the second coil 312'''' in FIG. 3*e* is the same as those of the first sub-coil 3111, or the second sub-coil 3112, with the second coil 312''' in FIG. 3*d*, and are not described redundantly.

Similarly, in order to increase the mutual inductance generated between the first coil and the second coil and improve the detection sensitivity, the second coil may also further include a third sub-coil and a fourth sub-coil with a common or independent winding paths, wherein each of the third sub-coil and the fourth sub-coil includes two connecting ends, one connecting end of the third sub-coil and one connecting end of the fourth sub-coil are jointly and electrically connected to an identical second signal line 33, and the other connecting end of the third sub-coil and the other connecting end of the fourth sub-coil are jointly and electrically connected to the common electrode line 34. The connecting modes of the third sub-coil and the fourth sub-coil are similar to those of the above-mentioned first sub-coil 3111 and second sub-coil 3112, and are not described redundantly.

In another embodiment, one connecting end of the first sub-coil and one connecting end of the second sub-coil may also be respectively connected to a different first signal lines 32 to separately input signals; and similarly, one connecting end of the third sub-coil and one connecting end of the fourth sub-coil may also be respectively connected to a different second signal lines 33 to separately output signals.

Compared with the prior art, the above-mentioned solution of the embodiment of the present invention has the advantages that on one hand, the space occupied for wiring is relatively small, the space occupied by the mutually inductive units is relatively large, the quantity of the mutually inductive units is relatively large, and thus the touch screen has more position coordinates for detection, so that the detection precision of touch points is relatively high; and on the other hand, since each mutually inductive unit is provided with an input terminal and the output terminal of a respective touch scanning signal, when a user simultaneously touches different points on the touch screen, the touch screen can determine the positions of multiple touch points through detecting the inductance change generated by the mutually inductive unit corresponding to each touch point, thus achieving multi-point touch.

Figure 4:
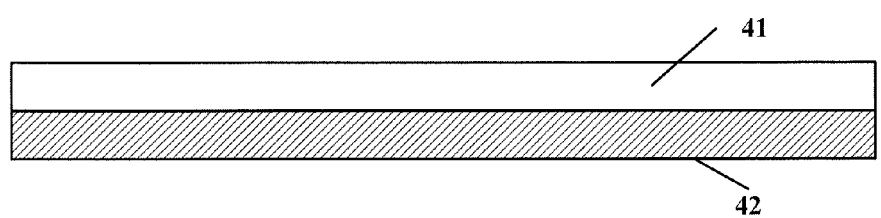
FIG. 4 is a schematic diagram of a cross-section structure of an inductive touch screen provided in another embodiment of the present invention.

Based on the above-mentioned touch point detecting circuit, an embodiment of the present invention also provides an inductive touch screen. FIG. 4 shows a schematic diagram of a cross-section structure of an inductive touch screen provided in the embodiment of the present invention, wherein the inductive touch screen includes a component layer 41, a wire change layer 42 electrically insulated from the component layer 41 and a touch point detecting circuit (not marked in FIG. 4) arranged on the component layer 41 and the wire change layer 42 electrically insulated from each other.

The touch point detecting circuit arranged on the component layer 41 and the wire change layer 42 electrically insulated from each other is specifically introduced below.

Figure 5:
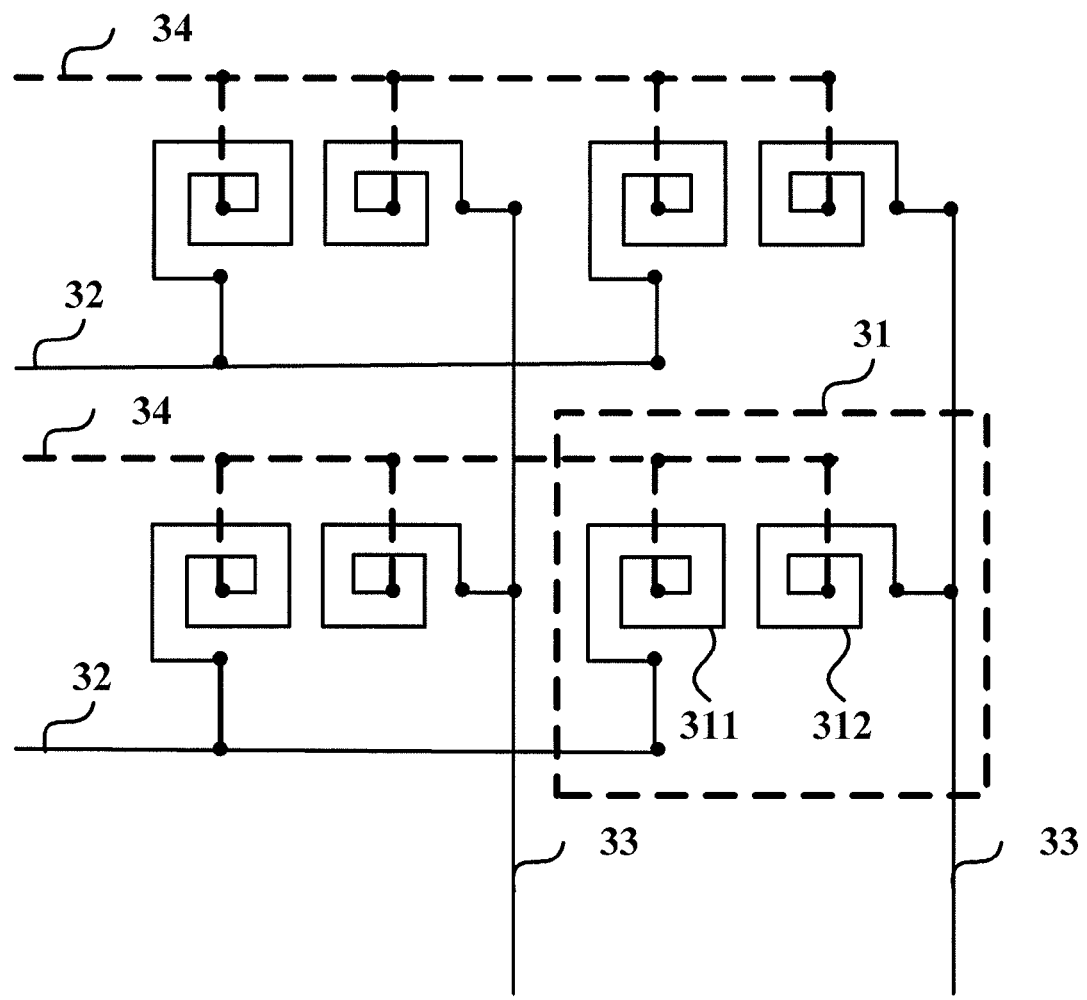
FIG. 5 is a partial schematic diagram of a touch point detecting circuit arranged on a component layer and a wire change layer electrically insulated from each other in another embodiment of the present invention.

FIG. 5 shows a partial schematic diagram of a touch point detecting circuit (reference can be made to the foregoing embodiments) arranged on a component layer 41 and a wire change layer 42 electrically insulated from each other in an embodiment of the present invention, wherein in conjunction with FIG. 4, each mutually inductive unit 31 (including a first coil 311 and a second coil 312) of the touch point detecting circuit is arranged on the component layer 41, a first signal line 32 and a second signal line 33 are also arranged on the component layer 41, a common electrode line 34 is arranged on the wire change layer 42, and the first coil 311 and the second coil 312 may be electrically connected to the common electrode line 34 through via holes. It should be noted that the first signal line 32 and the second signal line 33 may be simultaneously arranged in the component layer 41 or the wire change layer 42, or one is arranged in the component layer 41 and the other one is arranged in the wire change layer 42, as long as the first signal line 32 and the second signal line 33 meet the requirement of aforementioned electric connection structure but are irrelevant to the specific positions.

Moreover, the touch point detecting circuit may but not limited to fit the above-mentioned arrangement. In actual application, the mutually inductive unit 31 may also be wholly arranged on the wire change layer 42; or the first coil 311 and the second coil 312 in the mutually inductive unit 31 may respectively be arranged on different layers, namely, the first coil 311 is arranged on the component layer 41 and the second coil 312 is arranged on the wire change layer 42, or the first coil 311 is arranged on the wire change layer 42 and the second coil 312 is arranged on the component layer 41. When the first coil 311 and the second coil 312 in the mutually inductive unit 31 are arranged on different layers, the first coil 311 and the second coil 312 of the mutually inductive unit 31 may be partially overlapped and mutually insulated to increase the mutual inductance generated between the first coil 311 and the second coil 312 and thus improve the detection sensitivity, wherein an insulating layer may be formed between the first coil 311 and the second coil 312 for mutual electrical insulation, and the first coil 311 and the second coil 312 may also be electrically insulated from each other in other mode, which is not limited herein.

In addition, besides the first signal lines 32 or the second signal lines 33, the common electrode lines 34 may also be arranged on the component layer 41 or the wire change layer 42, as long as the aforementioned electrical connection structure is met.

Further, when the first coil 311 includes a first sub-coil and a second sub-coil, the first sub-coil and the second sub-coil may also be arranged on a same layer or different layers.

Further, when the second coil 312 includes a third sub-coil and a fourth sub-coil, the third sub-coil and the fourth sub-coil may also be arranged on a same layer or different layers.

It should be noted that the same layer or different layers herein indicate the component layer and the wire change layer, and the first sub-coil, the second sub-coil, the third sub-coil and the fourth sub-coil may be simultaneously located on the component layer or the wire change layer or not formed in the same layer at the same time, but are electrically insulated from each other.

A touch method for this inductive touch screen is specifically introduced as follows:

when each first signal line 32 is connected to an input terminal of a touch scanning signal, different first signal lines 32 are connected to different input terminals respectively, and each second signal line 33 is electrically connected to an output terminal of the touch scanning signal and different second signal lines 33 are connected to different output terminals respectively, firstly, successively inputting the touch scanning signal to the input terminal respectively connected to each first signal line 32; secondly, detecting the touch scanning signal output from the output terminal connected to each second signal line 33, and when the detected output touch scanning signal is changed compared to the input touch scanning signal, namely the input touch scanning signal is affected by the mutual inductance change produced by the mutually inductive unit 31 when passing through the mutually inductive unit 31, then determining a coordinates corresponding to the mutually inductive unit 31 which produces the mutual inductance change as the coordinates of a touch point; and finally, determining position of the touch point according to the determined coordinates of the touch point.

When each first signal line 32 is connected to an output terminal of a touch scanning signal, different first signal lines 32 are connected to different output terminals respectively, and each second signal line 33 is electrically connected to an input terminal of the touch scanning signal and different second signal lines 33 are connected to different input terminals respectively, the touch scanning signal is successively input to the input terminal connected to each second signal line 33, and the following processes are similar to the above-mentioned detecting method and therefore are not described redundantly.

Compared with the prior art, the above-mentioned solution of the embodiment of the present invention has the advantages that on one hand, the space occupied for wiring is relatively small, so the space occupied by the mutually inductive units is relatively large, thus the quantity of the mutually inductive units is relatively large, and the touch screen has more position coordinates for detection, so that the detection precision of touch points is relatively high; and on the other hand, since each mutually inductive unit is respectively provided with an input terminal and an output terminal of the touch scanning signal, when a user simultaneously touches different points on a touch screen, the touch screen can determine the positions of multiple touch points through detecting the inductance change generated by the mutually inductive unit corresponding to each touch point, thus achieving multi-point touch.

Based on the above-mentioned inductive touch screen, an embodiment of the present invention also provides a touch display device, including the inductive touch screen referred in any above-mentioned embodiment.

Although the preferred embodiments of the present application have been described, other changes and modifications could be made to these embodiments by those skilled in the art once they get the basic creative concepts. Accordingly, the appended claims are intended to be interpreted as covering the preferred embodiments and all the changes and modifications falling within the scope of the present invention.

Obviously, various alterations and variations could be made to the present invention by those skilled in the art without departing from the spirit and scope of the present invention. Thus, provided that these alterations and variations made to the present invention are within the scope of the claims of the present invention and equivalent technologies thereof, the present invention is intended to cover these alterations and variations.

What is claimed is:

1. A touch point detecting circuit, comprising:
a plurality of mutually inductive units arranged in an array, wherein each mutually inductive unit comprises a first coil and a second coil which are mutually coupled inductors, wherein the first coil of each mutually inductive unit in a same row is electrically connected to an identical first signal line, and the second coil of each mutually inductive unit in a same column is electrically connected to an identical second signal line,
wherein each first signal line is electrically connected to an input terminal of a touch scanning signal, and different first signal lines are electrically connected to different input terminals respectively; each second signal line is electrically connected to an output terminal of the touch scanning signal, and different second signal lines are electrically connected to different output terminals respectively; or
each first signal line is electrically connected to an output terminal of a touch scanning signal, and different first signal lines are electrically connected to different output terminals respectively; each second signal line is electrically connected to an input terminal of the touch scanning signal, and different second signal lines are electrically connected to different input terminals respectively.

2. The touch point detecting circuit according to claim 1, wherein a geometrical shape of the first coil or the second coil is any one of circle, square, rhombus and triangle.

3. The touch point detecting circuit according to claim 1, wherein each of the first coil and the second coil comprises two connecting ends;

the first coil of each mutually inductive unit in a same row is electrically connected to an identical first signal line is realized by that one connecting end of the first coil of each mutually inductive unit in a same row is electrically connected to an identical first signal line; and the second coil of each mutually inductive unit in a same column is electrically connected to an identical second signal line is realized by that one connecting end of the second coil of each mutually inductive unit in a same column is electrically connected to an identical second signal line.

4. The touch point detecting circuit according to claim 3, wherein the other connecting end of each first coil is electrically connected to a common electrode line; and the other connecting end of each second coil is electrically connected to the common electrode line.

5. The touch point detecting circuit according to claim 3, wherein the first coil comprises a first sub-coil and a second sub-coil, each of the first sub-coil and the second sub-coil comprising two connecting ends, wherein one connecting end of the first sub-coil and one connecting end of the second sub-coil are jointly and electrically connected to the identical first signal line, and the other connecting end of the first sub-coil and the other connecting end of the second sub-coil are jointly and electrically connected to a common electrode line.

6. The touch point detecting circuit according to claim 5, wherein the first sub-coil and the second sub-coil respectively have independent winding paths or have a common winding path.

7. The touch point detecting circuit according to claim 3, wherein the second coil comprises a third sub-coil and a fourth sub-coil, each of the third sub-coil and the fourth sub-coil comprising two connecting ends, wherein one connecting end of the third sub-coil and one connecting end of the fourth sub-coil are jointly and electrically connected to the identical second signal line, and the other connecting end of the third sub-coil and the other connecting end of the fourth sub-coil are jointly and electrically connected to a common electrode line.

8. The touch point detecting circuit according to claim 7, wherein the third sub-coil and the fourth sub-coil respectively have independent winding paths or have a common winding path.

9. The touch point detecting circuit according to claim 1, wherein, in the mutually inductive unit, a winding density of the first coil with the second coil at a mutual inductance position is higher than the winding density of the first coil with the second coil at a non-mutual inductance position, and the winding density of the second coil with the first coil at a mutual inductance position is higher than the winding density of the second coil with the first coil at a non-mutual inductance position.

10. An inductive touch screen, comprising a touch point detecting circuit, wherein the touch point detecting circuit comprises:

a plurality of mutually inductive units arranged in an array, wherein each mutually inductive unit comprises a first coil and a second coil which are mutually coupled inductors, wherein the first coil of each mutually inductive unit in a same row is electrically connected to an identical first signal line, and the second coil of each mutually inductive unit in a same column is electrically connected to an identical second signal line, wherein each first signal line is electrically connected to an input terminal of a touch scanning signal, and different first signal lines are electrically connected to different input terminals respectively; each second signal line is electrically connected to an output terminal of the touch scanning signal, and different second signal lines are electrically connected to different output terminals respectively; or each first signal line is electrically connected to an output terminal of a touch scanning signal, and different first signal lines are electrically connected to different output terminals respectively; each second signal line is electrically connected to an input terminal of the touch scanning signal, and different second signal lines are electrically connected to different input terminals respectively.

11. The inductive touch screen according to claim 10, further comprising a component layer and a wire change layer electrically insulated from each other;

the plurality of mutually inductive units are arranged on the component layer, and the first signal line and/or the second signal line are/is arranged on the component layer or the wire change layer.

12. The inductive touch screen according to claim 10, further comprising a component layer and a wire change layer electrically insulated from each other, wherein the first coil is arranged on the component layer or the wire change layer; and the second coil is arranged on the component layer or the wire change layer.

13. The inductive touch screen according to claim 10, further comprising a component layer and a wire change layer electrically insulated from each other, wherein the first coil of each mutually inductive unit is arranged on the component layer, and the second coil is arranged on the wire change layer; or, the first coil of each mutually inductive unit is arranged on the wire change layer, and the second coil is arranged on the component layer;

and the first coil and the second coil of each mutually inductive unit are partially overlapped.

14. The inductive touch screen according to claim 10, wherein each of the first coil and the second coil comprises two connecting ends;

the first coil of each mutually inductive unit in a same row is electrically connected to an identical first signal line is realized by that one connecting end of the first coil of each mutually inductive unit in a same row is electrically connected to an identical first signal line;

the second coil of each mutually inductive unit in a same column is electrically connected to an identical second signal line is realized by that one connecting end of the second coil of each mutually inductive unit in a same column is electrically connected to an identical second signal line;

the other connecting end of each first coil is electrically connected to a common electrode line; and the other connecting end of each second coil is electrically connected to the common electrode line, wherein the inductive touch screen further comprises a component layer and a wire change layer electrically insulated from each other, wherein the plurality of mutually inductive units are arranged on the component layer, and the first signal line and/or the second signal line and/or the common electrode line are/is arranged on the component layer or the wire change layer.

15. The inductive touch screen according to claim 10, wherein each of the first coil and the second coil comprises two connecting ends;

the first coil of each mutually inductive unit in a same row is electrically connected to an identical first signal line is realized by that one connecting end of the first coil of each mutually inductive unit in a same row is electrically connected to an identical first signal line; and the second coil of each mutually inductive unit in a same column is electrically connected to an identical second signal line is realized by that one connecting end of the second coil of each mutually inductive unit in a same column is electrically connected to an identical second signal line, wherein the first coil comprises a first sub-coil and a second sub-coil, each of the first sub-coil and the second sub-coil comprising two connecting ends, wherein one connecting end of the first sub-coil and one connecting end of the second sub-coil are jointly and electrically connected to the identical first signal line, and the other connecting end of the first sub-coil and the other connecting end of the second sub-coil are jointly and electrically connected to a common electrode line;

wherein the inductive touch screen further comprises a component layer and a wire change layer electrically insulated from each other, wherein the first sub-coil or the second sub-coil is arranged on the component layer or the wire change layer.

16. The inductive touch screen according to claim 10, wherein each of the first coil and the second coil comprises two connecting ends;

the first coil of each mutually inductive unit in a same row is electrically connected to an identical first signal line is realized by that one connecting end of the first coil of each mutually inductive unit in a same row is electrically connected to an identical first signal line; and the second coil of each mutually inductive unit in a same column is electrically connected to an identical second signal line is realized by that one connecting end of the second coil of each mutually inductive unit in a same column is electrically connected to an identical second signal line, wherein the second coil comprises a third sub-coil and a fourth sub-coil, each of the third sub-coil and the fourth sub-coil comprising two connecting ends, wherein one connecting end of the third sub-coil and one connecting end of the fourth sub-coil are jointly and electrically connected to the identical second signal line, and the other connecting end of the third sub-coil and the other connecting end of the fourth sub-coil are jointly and electrically connected to a common electrode line, wherein the inductive touch screen further comprises a component layer and a wire change layer electrically insulated from each other, wherein the third sub-coil or the fourth sub-coil is arranged on the component layer or the wire change layer.

17. A touch display device, comprising an inductive touch screen, the inductive touch screen comprising a touch point detecting circuit, wherein the touch point detecting circuit comprises:

a plurality of mutually inductive units arranged in an array, wherein each mutually inductive unit comprises a first coil and a second coil which are mutually coupled inductors, wherein the first coil of each mutually inductive unit in a same row is electrically connected to an identical first signal line, and the second coil of each mutually inductive unit in a same column is electrically connected to an identical second signal line, wherein each first signal line is electrically connected to an input terminal of a touch scanning signal, and different first signal lines are electrically connected to different input terminals respectively; each second signal line is electrically connected to an output terminal of the touch scanning signal, and different second signal lines are electrically connected to different output terminals respectively; or each first signal line is electrically connected to an output terminal of a touch scanning signal, and different first signal lines are electrically connected to different output terminals respectively; each second signal line is electrically connected to an input terminal of the touch scanning signal, and different second signal lines are electrically connected to different input terminals respectively.

* * * * *